Nov. 13, 1945.  C. B. AIKEN  2,388,896
ELECTRICAL METHOD AND APPARATUS FOR LOGGING BORE HOLES
Filed Jan. 28, 1942  2 Sheets-Sheet 2

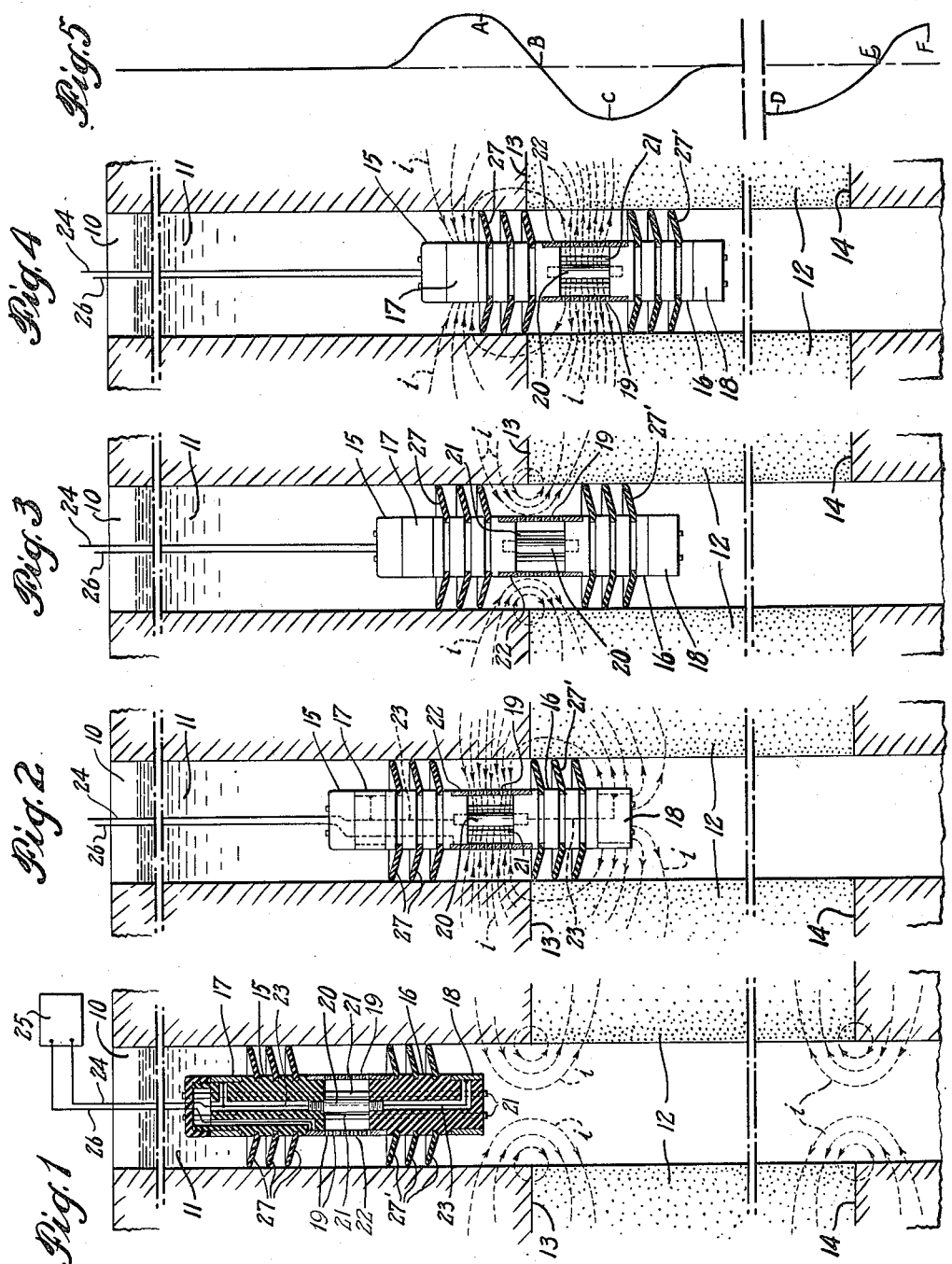

INVENTOR:
CHARLES B. AIKEN
BY
Hoguet, Neary & Campbell
ATTORNEYS

Patented Nov. 13, 1945

2,388,896

UNITED STATES PATENT OFFICE 2,388,896

ELECTRICAL METHOD AND APPARATUS FOR LOGGING BOREHOLES

Charles B. Aiken, North Plainfield, N. J., assignor to Schlumberger Well Surveying Corporation, Houston, Tex., a corporation of Delaware Application January 28, 1942, Serial No. 428,462

4 Claims. (Cl. 175—182)

The present invention relates to the investigation of earth formations traversed by a bore hole and more specifically to a new and improved method and apparatus for locating the upper and lower boundaries of relatively porous formations.

In the present practice, porous formations traversed by a bore hole are usually located by obtaining indications of spontaneous potentials at different depths therein in accordance with the method disclosed in prior Patent No. 1,913,293. As described in that patent, electro filtration potentials are produced in the vicinity of porous formations by the flow of the bore hole liquid into such porous formations. It has been found, however, that electro-filtration potentials are relatively small in the vicinity of thin formations in wells of relatively large diameter, and very sensitive indicating instruments, which are sometimes subject to spurious electrical disturbances, are required to obtain significant indications of such potentials.

An object of the present invention, accordingly, is to provide a new and improved method and apparatus for obtaining indications of spontaneous potentials in bore holes, in which thin porous formations may be located accurately with indicating instruments of ordinary commercial sensitivity.

A further object of the invention is to provide a new and improved method and apparatus utilizing measurements of spontaneous potentials in a bore hole for accurately locating the upper and lower boundaries of subterranean porous formations traversed thereby.

Another object of the invention is to provide a new and improved method and apparatus of the above character in which the currents flowing spontaneously through the bore hole liquid in the vicinity of porous formations are confined to predetermined paths whereby the magnitudes of the spontaneous potentials indicated may be substantially increased.

A further object of the invention is to provide a new and improved apparatus of the above character in which the electrical resistance of the current path in the direction of the axis of the bore hole is reduced whereby the horizontal potential gradient produced by electro-filtration currents flowing through the bore hole liquid may be substantially increased to provide an indication of increased magnitude.

The invention may be better understood from the following detailed description of several representative embodiments taken in conjunction with the accompanying drawings, in which Fig. 1 is a view in longitudinal section of investigating apparatus constructed according to the invention and located at a predetermined depth in a bore hole drilled into the earth;

Figs. 2, 3 and 4 are views in longitudinal section showing the apparatus of Fig. 1 in different positions in the vicinity of the upper boundary of a porous formation traversed by a bore hole;

Fig. 5 illustrates schematically the curve obtained by the apparatus shown in Figs. 1–4 as it passes the upper and lower boundaries of a porous formation;

Figure 6:
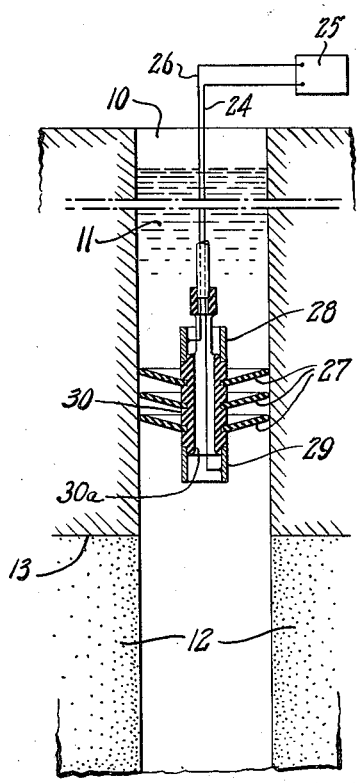
Fig. 6 is a view in longitudinal section of a modified form of apparatus constructed according to the invention.

Referring to Fig. 1, a bore hole 10 is shown in longitudinal section containing a column of relatively conductive liquid 11 and traversing a porous formation 12 which is defined by upper and lower boundaries 13 and 14, respectively. As explained in Patent No. 1,913,293, referred to above, the infiltration of the drilling fluid 11 into the porous formation 12 gives rise to a flow of electrical current $i$ through the bore hole liquid 11 in the direction indicated by the arrows. The flow illustrated is for an ideal case in which the upper and lower boundaries 13 and 14 are sharply defined and the formation 12 is entirely homogenous about the bore hole 10. Actually, the current flow may be somewhat modified under the conditions which usually prevail in a drill hole.

The apparatus for locating the boundaries of the formation 12 in accordance with the invention comprises a pair of vertically spaced apart cylindrical members 15 and 16 made of suitable insulating material such as neoprene, for example, at the upper and lower extremities of which are mounted the electrodes 17 and 18, respectively. The members 15 and 16 may be of any suitable dimensions, such as for example, about 4 inches in diameter and from 10 to 30 inches in length. The electrodes 17 and 18 may be of the same diameter as the members 15 and 16 and they are preferably rather small in area.

The cylindrical members 15 and 16 are mounted on a conducting rod 20 which also serves as an electrode as described hereinafter. Mounted between the cylindrical members 15 and 16 is a ring type electrode 22 provided with a plurality of perforations 19 permitting access of the bore hole liquid 11 to the electrode 20. The perforations 19 may have any desired size, position and number since these matters are of little significance electrically. The electrode 20 is connected through a conductor 23 to the upper and lower electrodes 17 and 18 and through a conductor 24 in the supporting cable (not shown) to one terminal of a conventional type indicating instrument 25, preferably of the recording type, located at the surface of the earth. The other terminal of the indicating instrument 25 is connected through a second conductor 26 in the supporting cable to the electrode 22.

Mounted on the cylindrical members 15 and 16 are a plurality of circular flexible fins 27 and 27' made of a suitable insulating material such as neoprene, for example. These fins are slightly larger in diameter than the diameter of the bore hole 10 and they serve to impede the flow of electric current through the bore hole liquid 11 between the outermost electrodes 17 and 18 and the intermediate electrode 20. In order to facilitate the passage of the apparatus through the bore hole liquid 11, a plurality of longitudinally extending conduits 21 may be provided in the cylindrical members 15 and 16. The conduits 21 should preferably be of reduced cross section and of non-conducting material so as not to disturb appreciably the current distribution which it is desired to maintain in the bore hole 10.

In operation, the investigating apparatus is lowered through the bore hole 10 at any suitable rate of speed and a continuous record is obtained with the indicating instrument 25. As the electrode 18 enters the current field $i$ and moves toward the position shown in Fig. 2, the reading of the instrument 25 increases steadily, reaching a maximum value (point A in Fig. 5) when the investigating apparatus is in the position shown in Fig. 2. In that position, the return path for the current $i$ through the bore hole liquid 11 is almost entirely blocked off by the fins 27' on the cylindrical member 16. The current $i$, accordingly, flows in a horizontal direction to the electrode 20, downwardly through the conductor 23 to the electrode 18 and then radially through the bore hole liquid 11 to the porous formation 12. In this fashion, a relatively high radial current density is produced so that the potential difference between the electrodes 20 and 22 is relatively large in magnitude.

As the apparatus continues to move downwardly through the bore hole, more and more of the upper portion of the porous formation 12 is made available as a return path for the current so that the current flowing to the electrode 20 steadily decreases. The decrease in current continues until a zero reading of the indicating instrument 25 is obtained (point B, Fig. 5) when the apparatus is in the position shown in Fig. 3 of the drawings. In that position substantially all of the current $i$ flows through the bore hole liquid 11 between the lowermost fin 27 on the insulated member 15 and the uppermost fin 27' on the insulated member 16.

The continued downward movement of the apparatus reduces the portion of the formation above the boundary 13 that is available as a path for the current $i$. Hence, part of the current $i$ begins to flow through the electrode 17, the conductor 23, the electrode 20, and the bore hole liquid 11 to the formation 12. Since the direction of the current flow between the electrodes 20 and 22 is reversed, the indications of the instrument 25 are now negative. The negative indication of the instrument 25 steadily increases to a maximum value (point C in Fig. 5) when the apparatus is in the position shown in Fig. 4.

As the apparatus continues to move downwardly through the bore hole 10, the potential indicated by the indicating instrument 25 drops once more substantially to zero and remains there until the electrode 18 comes into the influence of the current $i$ in the vicinity of the lower boundary 14 of the porous formation 12. When that occurs the sequence of events described above will be exactly reversed so that the curve shown in Fig. 5 will have the peaks D and F, respectively, and a point of reversal at E.

It will be apparent, therefore, that the upper and lower boundaries 13 and 14 of the porous formation 12 may be located very accurately by noting the depths at which the points of reversal B and E, respectively, occur on the curve of the potential gradient. When the formation 12 is quite thin, the two pairs of peaks A, C and D, F, in Fig. 5 get closer together until the peaks C and D finally coalesce, giving a characteristic curve for a thin layer. In this fashion, the upper and lower boundaries of relatively thin porous formations traversed by a bore hole of relatively large diameter may be readily located with instruments of ordinary commercial sensitivity.

It is also possible to obtain good results when either the cylindrical member 15 or the cylindrical member 16 is removed. For example, if the cylindrical member 16 and the electrode 18 are removed, the peaks C and F (Fig. 5) will still appear on the curve recorded by the instrument 25, enabling the upper and lower boundaries 13 and 14, respectively, of the formation 12 to be readily located.

In the embodiment shown in Fig. 6 of the drawings, a pair of spaced apart electrodes 28 and 29 are mounted at the upper and lower extremities of an insulated cylindrical member 30 on which are mounted a plurality of flexible fins 27. The insulated member 30 may be made solid or it may be provided with a hole 30a along its length through which the electro-filtration currents may pass. In such case, the diameter of the hole 30a should be relatively small so as to reduce the cross sectional area of the current path, thereby producing an increased potential gradient between the electrodes 28 and 29. The maximum potential is produced when the hole 30a is eliminated entirely.

The electrodes 28 and 29 are connected through the conductors 26 and 24 in the supporting cable to the indicating instrument 25 at the surface of the earth.

When the lowermost fin 27 on the cylindrical member 30 reaches the boundary 13 of the porous formation 12 in its downward travel, the current $i$ through the bore hole liquid 11 is confined to a path of relatively small cross sectional area. Consequently, a relatively high potential difference exists between the electrodes 28 and 29, which potential difference is maintained until the uppermost fin 27 has been lowered past the upper boundary 13 of the porous formation 12. It will be apparent that this modification provides positive and negative peaks, respectively, on the potential curve as the investigating apparatus passes the upper and lower boundaries 13 and 14 of the porous formation 12.

The invention thus provides a new and improved method and apparatus for locating relatively porous formations traversed by a bore hole. By confining the relatively small current found in the vicinity of the boundaries of thin formations, especially in bore holes of relatively large diameter, to a path of relatively small cross-section through the bore hole liquid, a relatively high current density is produced, which enables relatively high potential indications to be obtained from which the boundaries may be accurately located.

While several representative embodiments have been described in detail above, they are not intended to limit the invention, but are susceptible of numerous changes in form and detail within the scope of the following claims.

I claim:

1. Apparatus for determining the boundaries and thickness of permeable formations traversed by a bore hole containing a column of conductive liquid through which spontaneous currents flow in the vicinity of relatively permeable formations comprising: two vertically spaced apart electrodes; spontaneous potential recording means at the surface; each of said electrodes being connected electrically by an insulated conductor to said recording means; and a nonconducting body between said electrodes having a circumferential flexible portion conformable to the wall of said bore hole, said body being of such shape and dimensions as to form a substantially complete barrier to the flow of spontaneous currents through the bore hole liquid between said electrodes.

2. Apparatus for determining the boundaries of permeable formations traversed by a bore hole containing a column of conductive liquid through which spontaneous currents flow in the vicinity of relatively permeable formations comprising: three vertically spaced-apart electrodes adapted to be lowered into said bore hole, means directly electrically connecting said electrodes, means including at least one nonconducting body having a diameter substantially equal to the diameter of the bore hole forming a substantially complete barrier to the flow of electric current through the bore hole liquid between the uppermost electrode and the intermediate electrode, means including at least one nonconducting body having a diameter substantially equal to the diameter of the bore hole forming a substantially complete barrier to the flow of electrical current through the bore hole liquid between the lowermost electrode and said intermediate electrode, a fourth electrode in the bore hole spaced laterally from said intermediate electrode, and means for obtaining indications of the spontaneous potential differences between said intermediate electrode and said fourth electrode.

3. Apparatus for determining the boundaries of permeable formations traversed by a bore hole containing a column of conductive liquid through which spontaneous currents flow in the vicinity of relatively permeable formations, comprising three axially spaced electrodes adapted to be lowered into the bore hole, means directly electrically connecting said electrodes, an electrical insulating member engageable with the wall of said bore hole interposed between the middle electrode and each of the other electrodes forming substantially complete barriers to the flow of electrical current through the bore hole liquid between the middle electrode and the other electrodes, a fourth perforated electrode substantially concentric with and disposed outwardly of said intermediate electrode and means for obtaining indications of the spontaneous potential differences between said intermediate electrode and said fourth electrode.

4. A method of investigating earth formations traversed by a bore hole containing a column of conductive liquid through which spontaneous currents flow in the vicinity of porous formations comprising increasing the radial potential gradient resulting from the flow of said spontaneous currents by substantially completely physically and electrically segregating a relatively small body of said liquid in contact with the wall of said bore hole in a relatively short zone under test from the liquid above and below said zone, maintaining a central portion of the body of liquid in said zone at the same potential as the liquid adjacent to but outside of the zone of test, and obtaining indications of the radial potential gradient by measuring the spontaneous potential differences between said central portion of said liquid in said zone and a point in said liquid at the same horizontal level in said zone but spaced radially outward from said central portion.

CHARLES B. AIKEN.